US012609456B2

(12) United States Patent
Hsiao

(10) Patent No.: US 12,609,456 B2
(45) Date of Patent: Apr. 21, 2026

(54) SLOT ANTENNA STRUCTURE AND SLOT ANTENNA DEVICE INCLUDING THE SAME

(71) Applicant: Microwave Information Technology Ltd., Hsinchu City (TW)

(72) Inventor: Yu-Ting Hsiao, Hsinchu City (TW)

(73) Assignee: Microwave Information Technology Ltd., Hsinchu City (TW)

( * ) Notice: Subject to any disclaimer, the term of this patent is extended or adjusted under 35 U.S.C. 154(b) by 194 days.

(21) Appl. No.: 18/456,376

(22) Filed: Aug. 25, 2023

(65) Prior Publication Data

US 2024/0178572 A1 May 30, 2024

(30) Foreign Application Priority Data

Nov. 24, 2022 (TW) .................................. 111145034

(51) Int. Cl.
*H01Q 13/18* (2006.01)

(52) U.S. Cl.
CPC .................................. *H01Q 13/18* (2013.01)

(58) Field of Classification Search
CPC ..................................................... H01Q 13/18
See application file for complete search history.

(56) References Cited

U.S. PATENT DOCUMENTS

2025/0112360 A1 * 4/2025 Wu ........................ H01Q 13/18

* cited by examiner

*Primary Examiner* — Robert Karacsony
(74) *Attorney, Agent, or Firm* — Muncy, Geissler, Olds & Lowe, P.C.

(57) ABSTRACT

A slot antenna structure includes a metal trough and two metal plates. The metal trough includes a metal bottom plate, two metal sidewalls erected on two opposite long sides of the metal bottom plate respectively, two metal closing walls erected on two opposite short sides of the metal bottom plate respectively, and an opening formed and surrounded by the metal sidewalls and the metal closing walls. The metal plates are provided on the opening. A slot is formed between the metal plates and extends in a straight line to separate the metal plates. An electrical unit is provided on the metal plates and astride the slot. The metal plates and the metal trough form a resonance chamber in communication with the slot. The depth from the opening to the inner bottom side of the metal trough is generally one eighth of the wavelength of an input signal.

10 Claims, 5 Drawing Sheets

SLOT ANTENNA STRUCTURE AND SLOT ANTENNA DEVICE INCLUDING THE SAME

BACKGROUND OF THE INVENTION

Technical Field

The present invention relates to slot antennae. More particularly, the invention relates to a slot antenna structure and a slot antenna device including the same.

Description of Related Art

With the rapid development of such technologies as wireless communication and information processing, people's demand for, and dependence on, wireless communication has continuously increased. Through wireless networks that are designed to transmit massive amounts of information, people in different places can obtain information and exchange information with one another in real time such that interpersonal distances are shortened, making the world a global village where residents are closely connected.

Wireless communication products such as smartphones, personal digital assistants (PDAs), laptop computers, and tablet computers are nowadays upgraded on a regular basis, allowing each user to connect with others anywhere anytime in their daily life as well as during work, enjoying the conveniences brought to the human society by advanced technology.

To satisfy users' requirements for the external design of wireless communication products, those working in the industry have directed their research and development efforts toward lightweight and compactness. The trend of designing increasingly small products, however, results in a highly limited design space, which causes problem to the antenna design of a wireless communication device, whose communication performance is directly related to and is bound to be affected by the antenna.

In view of the above, the inventor of the present invention believed it necessary to devise a structurally simple antenna structure that has outstanding communication performance, can work with radio frequency identification (RFID) technology to detect objects precisely, and can thereby facilitate the storage management of objects (e.g., management of the storage locations, remaining quantities, expiration dates, or usage rates of products), the objective being to enhance the efficiency and effect of object management.

BRIEF SUMMARY OF THE INVENTION

The main purpose of the present invention is to provide a slot antenna structure, comprising a metal trough and two metal plates. The metal trough includes a metal bottom plate, two metal sidewalls standing upright on and along two opposite long sides of the metal bottom plate respectively, and two metal closing walls standing upright on and along two opposite short sides of the metal bottom plate respectively, and the metal trough further includes an opening formed and surrounded by the two metal sidewalls and the two metal closing walls. The two metal plates provided on the opening of the metal trough, with a slot formed between the two metal plates, wherein the slot extends in a straight line, has two ends located on top of the two metal closing walls respectively, and thereby separates the two metal plates, an electrical unit is provided on the two metal plates and astride the slot, the two metal plates and the metal trough form a resonance chamber in communication with the slot, and a depth from the opening to an inner bottom side of the metal trough is generally one eighth of a wavelength of an input signal.

Further, the resonance chamber is provided therein with a dielectric material, and the dielectric material is air or an FR4 material.

Further, the opening is rectangular, and the slot is rectangular.

Further, the electrical unit is a metal conducting plate or an electrical wire provided on the two metal plates and astride the slot.

Further, the electrical unit is provided generally at a said end of the slot.

Another purpose of the present invention is to provide a slot antenna device comprising a signal input device, a metal trough and two metal plates. The metal trough includes a metal bottom plate, two metal sidewalls standing upright on and along two opposite long sides of the metal bottom plate respectively, and two metal closing walls standing upright on and along two opposite short sides of the metal bottom plate respectively, and the metal trough further includes an opening formed and surrounded by the two metal sidewalls and the two metal closing walls. The two metal plates provided on the opening of the metal trough, with a slot formed between the two metal plates, wherein the slot extends in a straight line, has two ends located on top of the two metal closing walls respectively, and thereby separates the two metal plates, an electrical unit is provided on the two metal plates and astride the slot, the electrical unit is connected to the two metal plates and is electrically connected to the signal input device, the two metal plates and the metal trough form a resonance chamber in communication with the slot, and a depth from the opening to an inner bottom side of the metal trough is generally one eighth of a wavelength of an input signal input by the signal input device.

Further, the resonance chamber is provided therein with a dielectric material, and the dielectric material is air or an FR4 material.

Further, the opening is rectangular, and the slot is rectangular.

Further, the electrical unit is a metal conducting plate or an electrical wire provided on the two metal plates and astride the slot.

Further, the electrical unit is provided generally at a said end of the slot.

The present invention provides a slot antenna structure and a slot antenna device including the same. The slot antenna structure includes a metal trough with an opening. Two metal plates are provided on the opening in such a way that a slot is formed between the two metal plates. The slot is in communication with a resonance chamber formed between the metal trough and the two metal plates. The depth from the opening to the inner bottom side of the metal trough is generally one eighth of the wavelength of an input signal in order to cause air resonance.

DETAILED DESCRIPTION OF THE INVENTION

Figure 1:
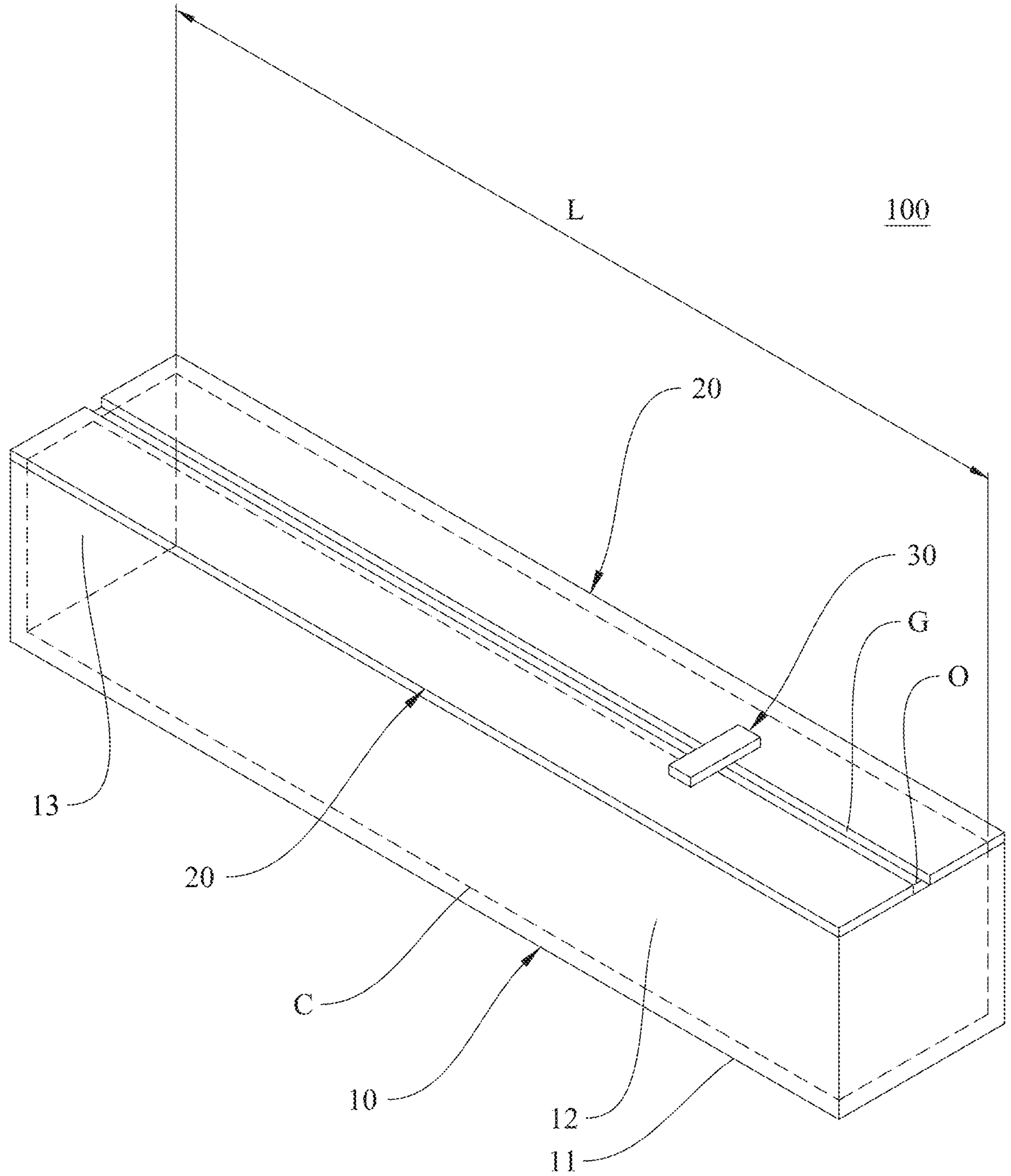
FIG. 1 is a perspective view of a slot antenna structure according to the present invention.

The detailed description and technical contents of the present invention are described below with respect to the drawings. Furthermore, the drawings in the present invention may not be drawn to the actual scale for the convenience of illustration, but may be exaggerated, and such drawings and their scale are not used to limit the scope of the present invention.

A detailed description of the present invention is given below. To begin with, please refer to FIG. 1 and FIG. 2 for a perspective view and a sectional view of a slot antenna structure according to the invention.

The present invention discloses a slot antenna structure 100. The slot antenna structure 100 includes a metal trough 10 and two metal plates 20. In one embodiment, the metal trough 10 and/or the two metal plates 20 is made of, for example but not limited to, a single metal material or an alloy of at least two metal materials. In another embodiment, the metal trough 10 and the two metal plates 20 are made of, for example but not limited to, the same metal material or different metal materials respectively.

The metal trough 10 includes a metal bottom plate 11, two metal sidewalls 12 that stand upright on and along the two opposite long sides of the metal bottom plate 11 respectively, and two metal closing walls 13 that stand vertically on and along the two opposite short sides of the metal bottom plate 11 respectively. The metal trough 10 further includes an opening O that is formed and surrounded by the two metal sidewalls 12 and the two metal closing walls 13. The two metal plates 20 are provided on the opening O of the metal trough 10 in such a way that a slot G is formed between the two metal plates 20. The slot G extends in a straight line, has two ends located on top of the two metal closing walls 13 respectively, and thus separates the two metal plates 20. In one embodiment, the opening O is rectangular, and the slot G is also rectangular.

An electrical unit 30 is provided across the two metal plates 20. The electrical unit 30 is a metal conducting plate, an electrical wire, or another element that is provided across the two metal plates 20 to connect the two metal plates 20. In one embodiment, the electrical unit 30 is provided generally at one or the other end of the slot G. For example, the two ends of the electrical unit 30 in FIG. 1 are provided on the two metal plates 20 respectively, and the electrical unit 30 may be adjacent to one of the metal closing walls 13 of the metal trough 10 or located generally at a position corresponding to the middle of the slot G between the two metal plates 20. In one embodiment, the electrical unit 30 is made of, for example but not limited to, a single metal material or an alloy of at least two metal materials. In another embodiment, the electrical unit 30, the metal trough 10, and the two metal plates 20 are made of, for example but not limited to, the same metal material or different metal materials respectively.

Figure 2:
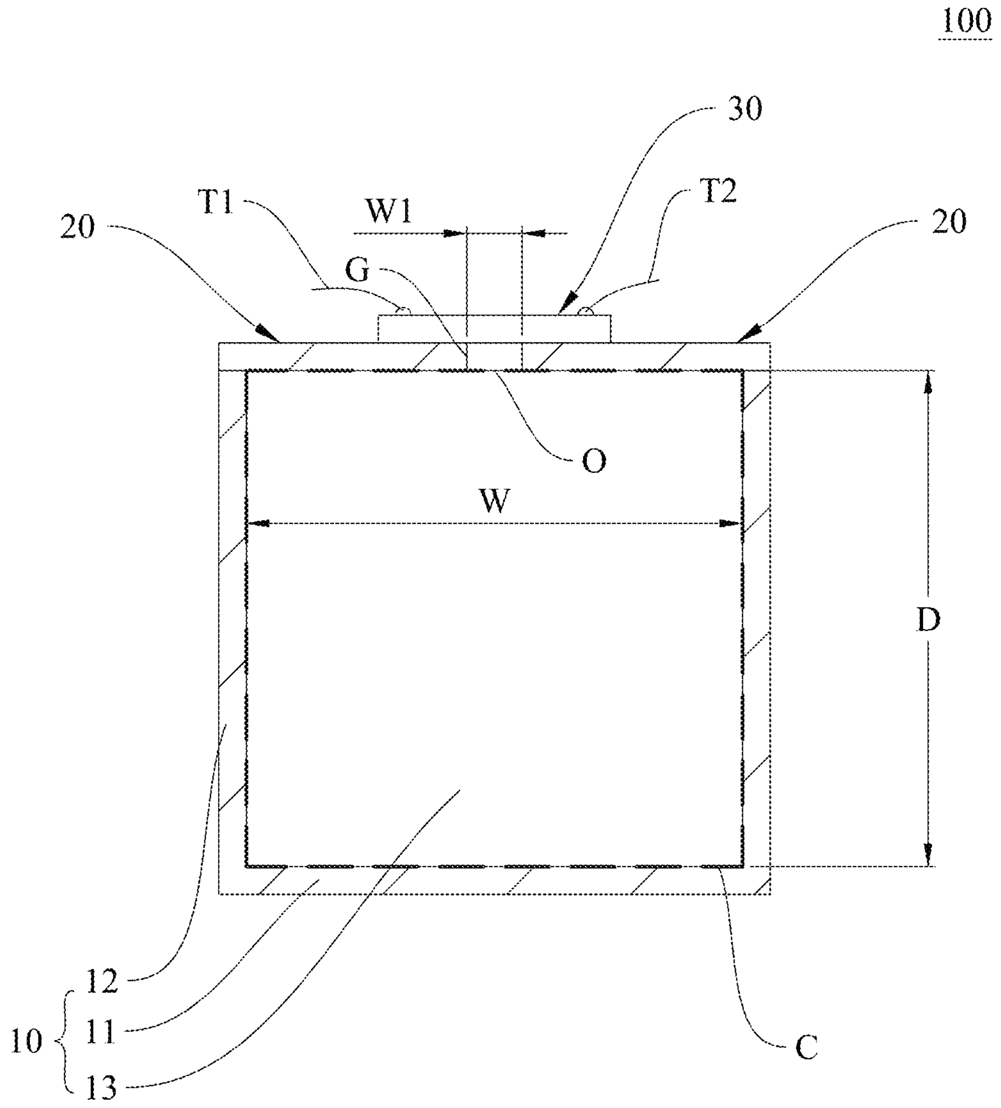
FIG. 2 is a sectional view of the slot antenna structure according to the present invention.

The two metal plates 20 and the metal trough 10 form a resonance chamber C that is in communication with the slot G. In FIG. 1 and FIG. 2, the resonance chamber C is drawn with a dashed line. The depth D from the opening O to the inner bottom side of the metal trough 10 is generally one eighth of the wavelength of an input signal in order to cause air resonance. The dielectric material in the resonance chamber C is air or an FR4 material. The term "FR4 material" refers to a fiberglass plate with an epoxy binder and is also known as FR4 epoxy glass cloth, an insulating plate, an epoxy plate, an epoxy resin plate, a brominated epoxy resin plate, FR4, a fiberglass plate, a glass fiber plate, an FR4 reinforcement plate, an FPC reinforcement plate, a flexible printed circuit board reinforcement plate, an FR4 epoxy resin plate, a fire-retardant insulating plate, an FR4 laminated plate, an epoxy plate, a bare FR4 plate, an FR4 fiberglass plate, epoxy glass cloth, an epoxy glass cloth laminated plate, or a circuit board drilling pad. An FR4 material has relatively good dielectric properties and can resonate with a radio frequency signal along with the metal trough 10, the slot G formed between the two metal plates 20, and the resonance chamber C. In one embodiment, the width W of the resonance chamber C may be generally equal to the depth D (as shown in FIG. 2) or different from the depth D. In another embodiment, the length of the resonance chamber C may be generally equal to the depth D (not shown) or different from the depth D (as shown in FIG. 1 for example, but not limited to, where the length L of the resonance chamber C is more than twice as great as the depth D). In another embodiment, the width W1 of the slot G is generally equal to the width W of the resonance chamber C reduced by 50% or more. Although the foregoing description relates to different embodiments, it is feasible in practice to combine the various aspects of those embodiments into one embodiment; the present invention has no limitation in this regard.

Figure 3:
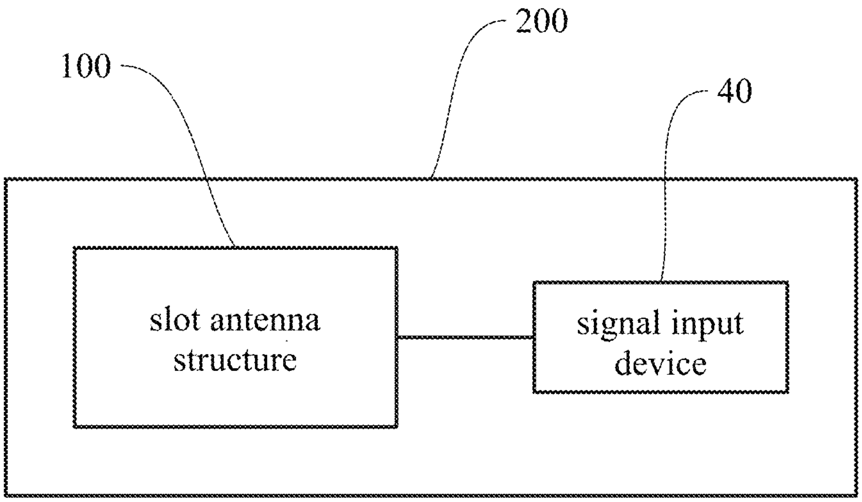
FIG. 3 is a schematic drawing of a slot antenna device according to the present invention.
Figure 4:
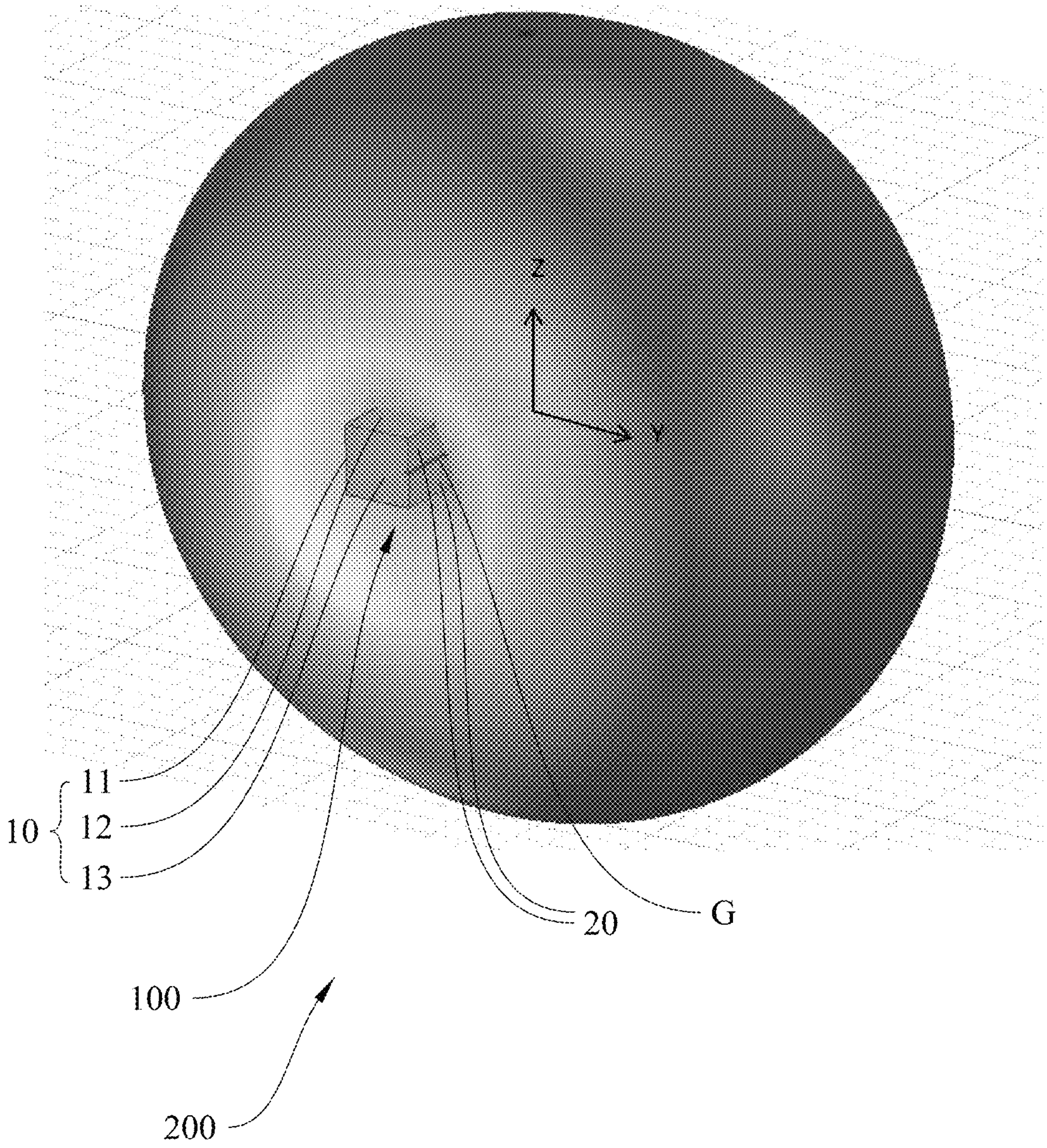
FIG. 4 shows a 3D radiation pattern of the slot antenna device according to the present invention.
Figure 5:
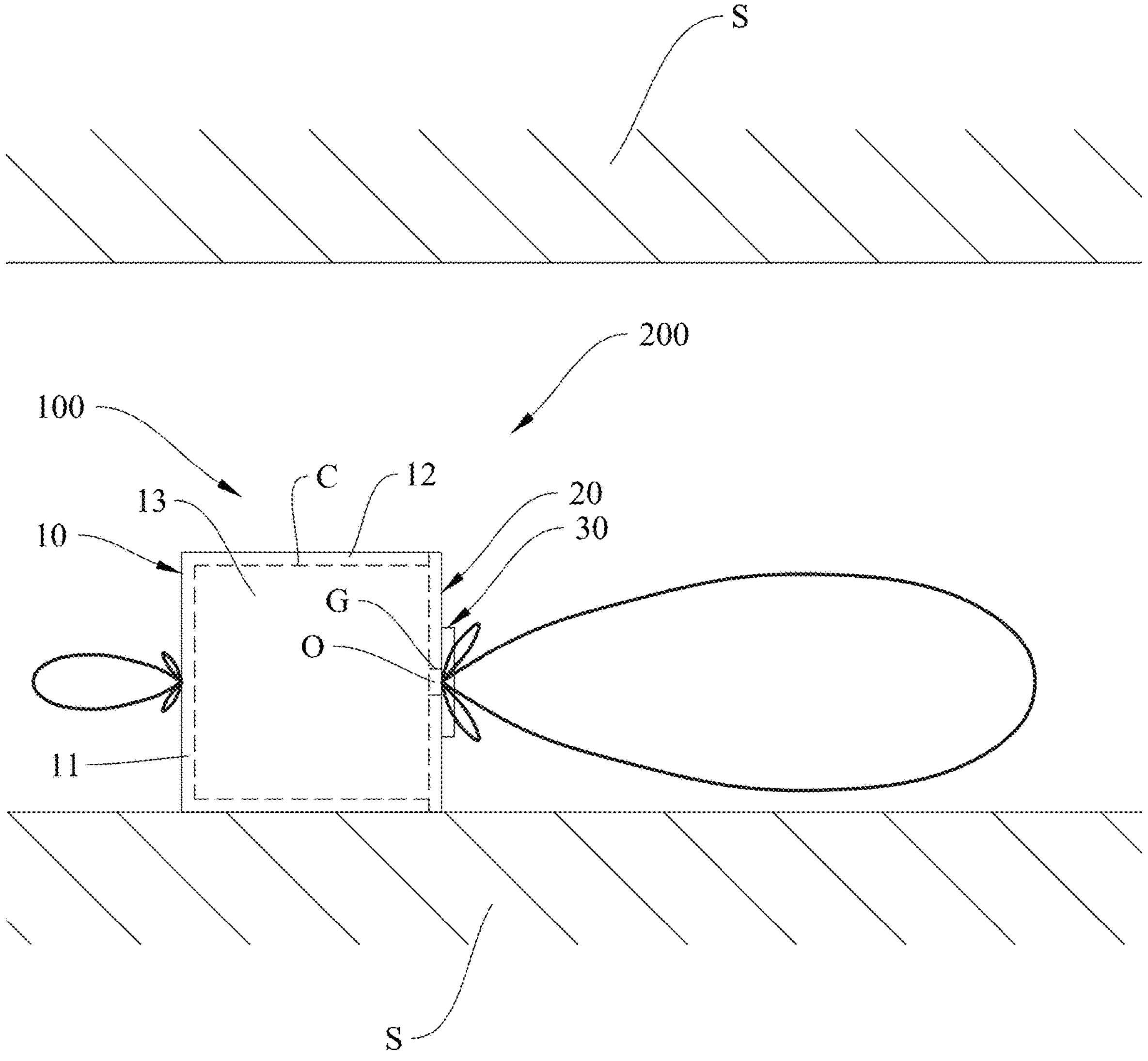
FIG. 5 shows another 3D radiation pattern of the slot antenna device according to the present invention.

Please refer to FIG. 3 to FIG. 5 for a schematic drawing of a slot antenna device according to the present invention and 3D radiation patterns of the slot antenna device under different circumstances. In this embodiment, the metal trough, the two metal plates, and the electrical unit are identical in structure to their respective counterparts in the foregoing slot antenna structure. Those structurally identical parts will not be described repeatedly in the following paragraphs.

The present invention further discloses a slot antenna device 200. The slot antenna device 200 includes a signal input device 40, the metal trough 10 described above, and the two metal plates 20 described above. The electrical unit 30 described above is provided on the two metal plates 20 and astride the slot G, are connected to the two metal plates 20 respectively, and are electrically connected to the signal input device 40. The two metal plates 20 and the metal trough 10 form the resonance chamber C in communication with the slot G. The depth from the opening of the metal trough 10 to the inner bottom side of the metal trough 10 is generally one eighth of the wavelength of the input signal from the signal input device 40 in order to cause air resonance, or more particularly to cause air to resonate with the radio frequency signal input by the signal input device 40, along with the metal trough 10, the slot G formed between the two metal plates 20, and the resonance chamber C. In one embodiment, the signal input device 40 may be, for example but not limited to, any device that can output a radio frequency signal to and input a radio frequency signal from the slot antenna structure 100.

Referring to FIG. 4, in the absence of any shielding around the periphery of the slot antenna structure 100, the radiation is directed around the periphery of the slot antenna structure 100. The periphery is the location of the two metal plates 20, the two lateral metal sidewalls 12, and the metal bottom plate 11. Radiation from the slot antenna structure 100 has higher intensity in the periphery (the dark-color area in FIG. 4) than in the region adjacent to each metal closing wall 13 (the light-color area in FIG. 4).

Referring to FIG. 5, when there is a shielding structure S on each of two opposite lateral sides of the slot antenna structure 100 (i.e., when there is a shielding structure S outside each of the metal sidewalls 12 of the metal trough 10), the slot antenna structure 100 radiates in such a way that a narrow main lobe extending outward in a direction from the opening O of the metal trough 10 toward the slot G is formed, meaning the slot antenna structure 100 has high directivity. The high-directivity slot antenna structure 100 of the present invention helps increase the success rate of reading a corresponding device in a specified area and lower the risk of misreading from a non-specified area.

According to the above, the present invention provides a slot antenna structure and a slot antenna device including the slot antenna structure. Two metal plates are provided on the opening of the metal trough of the slot antenna structure. A slot is formed between the two metal plates and is in communication with a resonance chamber formed between the metal trough and the two metal plates. The depth from the opening to the inner bottom side of the metal trough is generally one eighth of the wavelength of the input signal in order for air resonance to take place.

The above has been described in detail, but the above is only one of the better embodiments of the present invention, which should not be used to limit the scope of the present invention. In other words, all changes and modifications made in accordance with the scope of the patent application of the present invention shall remain within the scope of the present invention.

What is claimed is:

1. A slot antenna structure, comprising:

a metal trough, wherein the metal trough includes a metal bottom plate, two metal sidewalls standing upright on and along two opposite long sides of the metal bottom plate respectively, and two metal closing walls standing upright on and along two opposite short sides of the metal bottom plate respectively, and the metal trough further includes an opening formed and surrounded by the two metal sidewalls and the two metal closing walls; and two metal plates provided on the opening of the metal trough, with a slot formed between the two metal plates, wherein the slot extends in a straight line, has two ends located on top of the two metal closing walls respectively, and thereby separates the two metal plates, an electrical unit is provided on the two metal plates and astride the slot, the two metal plates and the metal trough form a resonance chamber in communication with the slot, and a depth from the opening to an inner bottom side of the metal trough is generally one eighth of a wavelength of an input signal.

2. The slot antenna structure of claim 1, wherein the resonance chamber is provided therein with a dielectric material, and the dielectric material is air or an FR4 material.

3. The slot antenna structure of claim 2, wherein the opening is rectangular, and the slot is rectangular.

4. The slot antenna structure of claim 3, wherein the electrical unit is a metal conducting plate or an electrical wire provided on the two metal plates and astride the slot.

5. The slot antenna structure of claim 4, wherein the electrical unit is provided generally at a said end of the slot.

6. A slot antenna device, comprising:

a signal input device;

a metal trough, wherein the metal trough includes a metal bottom plate, two metal sidewalls standing upright on and along two opposite long sides of the metal bottom plate respectively, and two metal closing walls standing upright on and along two opposite short sides of the metal bottom plate respectively, and the metal trough further includes an opening formed and surrounded by the two metal sidewalls and the two metal closing walls; and two metal plates provided on the opening of the metal trough, with a slot formed between the two metal plates, wherein the slot extends in a straight line, has two ends located on top of the two metal closing walls respectively, and thereby separates the two metal plates, an electrical unit is provided on the two metal plates and astride the slot, the electrical unit is connected to the two metal plates and is electrically connected to the signal input device, the two metal plates and the metal trough form a resonance chamber in communication with the slot, and a depth from the opening to an inner bottom side of the metal trough is generally one eighth of a wavelength of an input signal input by the signal input device.

7. The slot antenna device of claim 6, wherein the resonance chamber is provided therein with a dielectric material, and the dielectric material is air or an FR4 material.

8. The slot antenna device of claim 7, wherein the opening is rectangular, and the slot is rectangular.

9. The slot antenna device of claim 8, wherein the electrical unit is a metal conducting plate or an electrical wire provided on the two metal plates and astride the slot.

10. The slot antenna device of claim 9, wherein the electrical unit is provided generally at a said end of the slot.

* * * * *